2,744,796

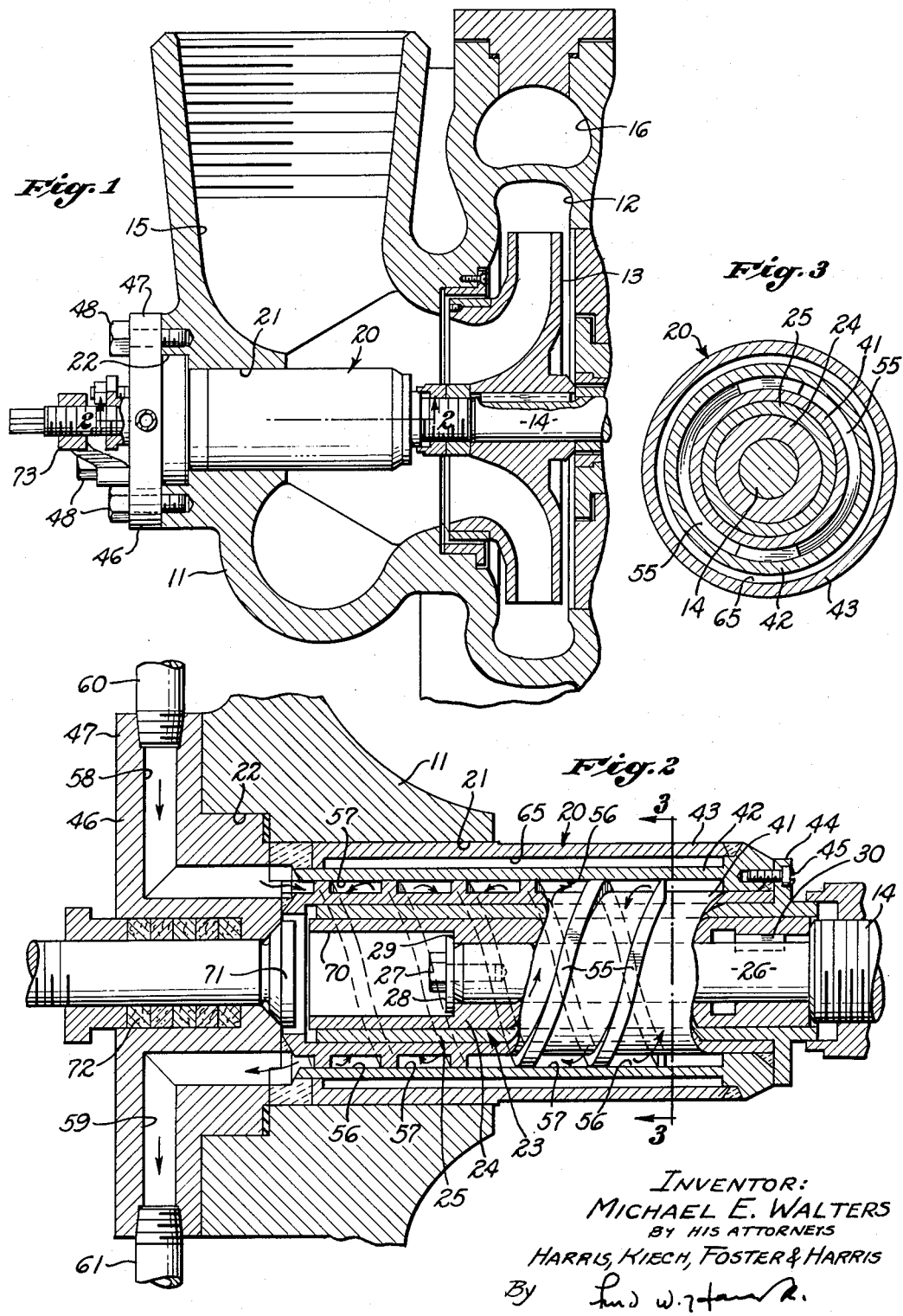

FLUID-COOLED BEARING

Michael E. Walters, Huntington Park, Calif., assignor to Pacific Pumps, Inc., Huntington Park, Calif., a corporation of California Application January 2, 1953, Serial No. 329,317

8 Claims. (Cl. 308—77)

The present invention relates in general to bearings and a primary object of the invention is to provide a bearing or bearing structure which is continuously cooled by circulating a fluid therethrough during operation of the bearing.

While the present invention has applications in any installations where bearings are required to operate in zones of high temperature, it is particularly applicable to a bearing located in the path of flow of hot water or steam under pressure to the inlet of a centrifugal impeller and such an application of the invention will be considered herein for illustrative purposes. Centrifugal pumps are frequently required to handle water or steam under pressure at high temperatures, e. g., several hundred degrees, and are frequently called upon to handle other fluids at high temperatures. Conventional bearings employed under such conditions have a relatively short life span attributable in part directly to such high temperature operation per se, but more particularly to the impossibility of providing adequate lubrication under such conditions. Even lubricants designed for high temperature operation will not provide adequate lubrication for bearings utilized in centrifugal pumps designed to handle water or steam under pressure at extremely high temperatures. The present invention, by providing means for continuously cooling the bearing, avoids the rapid bearing wear experienced with conventional bearings and does this with ordinary lubricants, which are important features.

Considering the invention more specifically, an important object thereof is to provide a bearing disposed in a housing having coolant inflow and outflow channels in an annular zone around the bearing to provide cooling over the entire surface area of the bearing.

Another object is to provide inflow and outflow channels which are arranged in alternating relation so as to attain substantially uniform cooling of the bearing over its entire surface area.

More particularly, an object of the invention is to provide inflow and outflow channels which are helical and interlaced to provide the desired alternating relation therebetween.

Another object is to provide an insulating means in the housing in a second annular zone around the first annular zone mentioned to reduce the amount of heat reaching the coolant inflow and outflow channels. An important object in this connection is to provide an insulating means which comprises an annular dead air space surrounding the annular zone in which the inflow and outflow channels are disposed.

The foregoing objects, advantages and features of the present invention, together with other objects, advantages and features thereof which will become apparent, may be attained with the exemplary embodiment of the invention which is illustrated in the accompanying drawing and which is described in detail hereinafter.

Referring to the drawing:

Fig. 1 is a fragmentary longitudinal sectional view of a centrifugal pump incorporating the fluid-cooled bearing of the invention;

Fig. 2 is an enlarged, fragmentary sectional view taken along the arrowed line 2—2 of Fig. 1; and Fig. 3 is a transverse sectional view taken along the arrowed line 3—3 of Fig. 2 of the drawing.

Referring particularly to Fig. 1 of the drawing, illustrated fragmentarily therein is a centrifugal pump which is adapted to pump fluid at high pressures and temperatures. For example, the pressure of the fluid may be of the order of magnitude of 1200 p. s. i. and the temperature thereof may be of the order of magnitude of 600° F. although these values may be varied widely and are merely intended as illustrative. The pump includes a housing 11 which provides an impeller chamber 12 for a centrifugal impeller 13 which is mounted on a shaft 14, the impeller being keyed or otherwise secured to the shaft so as to be rotatable therewith. The impeller 13 is of the axial-intake radial-discharge type, the inlet of the impeller communicating with an inlet 15 in the housing 11 and the outlets of the impeller communicating with an outlet 16 in the housing. As will be understood, when the shaft 14 is driven by any suitable means, not shown, the impeller 13 pumps fluid through the impeller chamber 12 from the inlet 15 to the outlet 16 and discharges it into the outlet at a pressure higher than that obtaining in the inlet.

The bearing structure of the invention is designated generally by the numeral 20 and is disposed in a bore 21 and a counterbore 22 in the pump housing 11 in alignment with the shaft 14. The bearing structure 20 includes a bearing 23 which is composed of an inner bearing member 24 and an outer bearing member 25 journalled on the inner bearing member in the particular construction illustrated, it being understood that other types of bearings may be utilized in place of the particular bearing 23 illustrated. The inner bearing member 24 is tubular and is telescoped over a reduced-diameter portion 26 of the shaft 14. Withdrawal of the inner bearing member 24 from the shaft is prevented by a bolt 27 threaded into the reduced-diameter portion 26 of the shaft and seated against a washer 28 which, in turn, is seated on an internal shoulder 29 within the inner bearing member. Relative rotation between the shaft 14 and the inner bearing member 24 is prevented by a key 30.

The bearing 23, comprising the inner and outer bearing members 24 and 25, is enclosed by a housing which includes sleeves 41, 42 and 43 in the particular construction illustrated, the sleeve 41 being telescoped over the outer bearing member 25, the sleeve 42 being telescoped over the sleeve 41, and the sleeve 43 being telescoped over the sleeve 42. The three sleeves 41, 42 and 43 are welded, or otherwise secured together, the outer sleeve 43 making contact with the wall of the bore 21 throughout a portion of its length. The outer bearing member 25 is provided with a flange 44 which is secured to one end of the housing defined by the sleeves 41, 42 and 43 by bolts or screws 45 to prevent rotation of the outer bearing member relative to such housing.

The housing of the bearing structure 20 also includes a cap of plug 46 which is provided with a reduced diameter portion extending into the counterbore 22 and welded or otherwise secured to the sleeves 41, 42 and 43, the cap 46 also having a flange 47 through which bolts 48 extend into the pump housing 11 to secure the entire bearing structure 20 in place.

The sleeve 41 is provided on its exterior with a double helical thread, i. e., it is provided on its exterior with two interlaced helical threads or ribs 55 the crests of which engage the inner wall of the sleeve 42. The interlaced helical ribs 55 provide therebetween interlaced, helical, inflow and outflow channels 56 and 57 for a coolant, these channels being interconnected in fluid communication at the inner end of the bearing structure 20. At the outer end of the bearing structure 20, the inflow channel 56 communicates with an inflow passage 58 in the cap 46 and the outflow channel 57 communicates with an outflow passage 59 in the cap. A coolant supply line 60 communicates with the inflow passage 58 and a coolant disposal line 61 communicates with the outflow passage 59.

The sleeves 42 and 43 provide therebetween an annular dead air space 65 which encircles the annular cooling zone occupied by the inflow and outflow channels 56 and 57 to minimize heat transmission inwardly toward the bearing 23, the dead air space 65 thus serving as an insulating means.

Considering the operation of the bearing structure 20 of the invention, a coolant, such as water, for example, is continuously circulated from the supply line 60 and the inflow passage 58 through the inflow and outflow channels 56 and 57 to the outflow passage 59 and the disposal line 61 during the operation of the bearing structure, thereby maintaining the temperature of the bearing 23 at an acceptable value. As an example, tests have shown that, where the pump is handling a fluid with a temperature of 600° F. and where the coolant is delivered to the inflow passage 58 at a temperature of 65° F., the temperature of the coolant leaving the outflow passage 59 is only about 140° F. Thus, it will be seen that the bearing temperature is maintained at a low value, which is an important feature.

The dead air space 65 also contributes materially to maintaining the bearing temperature at an acceptable low value by reducing the heat transfer radially inwardly toward the bearing, which is an important feature of the invention. In the absence of the dead air space 65, the coolant channels 56 and 57 would be directly exposed to the high temperature fluid being handled by the pump with the result that the bearing 23 would operate at substantially higher temperatures, which, of course, would be undesirable.

Another feature of the invention resides in the alternating relation between the convolutions of the inflow and outflow channels 56 and 57, which relation results in maintaining substantially uniform temperatures throughout the entire bearing 23. As will be apparent, this alternating relation keeps all parts of the bearing 23 at substantially the same temperature.

By maintaining the bearing temperature at a relatively low value in this manner, ordinary lubricants can be used for the bearing, no special high temperature lubricants being required. In the particular construction illustrated, the bearing 23 is lubricated by placing the lubricant in a lubricant chamber 70. The lubricant is preferably grease which is forced into the bearing by a plunger 71 having a stem which extends through packing 72 in the cap 46 to the exterior of the bearing structure 20, the plunger being threaded through a bracket 73 secured to the cap 46 by one or more of the bolts 48. As will be apparent, by rotating the plunger stem, as by a wrench applied to the outer end thereof, the plunger is advanced into the lubricant chamber 70 to force the lubricant into the bearing 23.

Although I have disclosed an exemplary embodiment of my invention herein for purposes of illustration, it will be understood that various changes, modifications and substitutions may be incorporated in such embodiment without departing from the spirit of the invention as defined by the claims which follow.

I claim as my invention:

1. In a fluid-cooled bearing structure, the combination of: a bearing; a housing for said bearing providing coolant inflow and outflow channels in an annular zone around said bearing, said inflow and outflow channels being arranged in alternating relation; and insulating means in said housing in a second annular zone around and external to the first annular zone mentioned.

2. A fluid-cooled bearing structure as defined in claim 1 wherein said insulating means comprises a dead air space in said second annular zone.

3. In a fluid-cooled bearing structure, the combination of: a bearing; a housing for said bearing providing coolant inflow and outflow channels in an annular zone around said bearing, said inflow and outflow channels being helical and interlaced; and insulating means in said housing in a second annular zone around and external to the first annular zone mentioned.

4. A fluid-cooled bearing structure as defined in claim 3 wherein said insulating means comprises an annular dead air space in said second annular zone.

5. In a fluid-cooled bearing structure, the combination of: a bearing including inner and outer bearing members; a sleeve telescoped over said outer bearing member and having a double helical thread on its exterior, said double helical thread providing helical and interlaced inflow and outflow channels for a coolant, the threads of said double helical thread being narrow as compared to said channels; and a second sleeve telescoped over said double helical thread to close said inflow and outflow channels.

6. A fluid-cooled bearing structure as defined in claim 5 including a third sleeve enclosing said second sleeve and providing therebetween an annular dead air space.

7. A fluid-cooled bearing structure including a bearing and including a housing containing said bearing and providing an annular zone around said bearing having helical coolant inflow and outflow channels therein in alternating, interlaced relation, said channels being separated by ribs which are narrow as compared to said channels to provide channels of maximum width, said inflow and outflow channels being connected in fluid communication at one end of said bearing and extending substantially from the other end of said bearing to said one end thereof so that the coolant flows from said other end of said bearing to said one end thereof and back to said other end thereof along wide, interlaced, helical paths, said housing providing a dead air space in a second annular zone around the first annular zone mentioned.

8. In a fluid-cooled bearing structure, the combination of: a bearing; and a housing for said bearing providing coolant inflow and outflow channels in an annular zone around said bearing, said inflow and outflow channels being helical and interlaced and being separated by helical threads which are narrow as compared to said channels to provide channels of maximum width, said inflow and outflow channels being connected in fluid communication at one end of said bearing and extending substantially from the other end of said bearing to said one end thereof so that the coolant flows from said other end of said bearing to said one end thereof and back to said other end thereof along wide, interlaced, helical paths, said bearing including inner and outer bearing members and said housing including inner and outer sleeve members defining said channels therebetween, said inner sleeve member being telescoped over said outer bearing member, said structure including a third sleeve member enclosing said second sleeve member and providing therebetween an annular dead air space.

References Cited in the file of this patent

UNITED STATES PATENTS

| | | |
|---|---|---|
| 2,173,225 | Berry | Sept. 19, 1939 |
| 2,573,597 | Paden | Oct. 30, 1951 |

FOREIGN PATENTS

| | | |
|---|---|---|
| 498,773 | Germany | June 2, 1930 |